(12) United States Patent
Fong

(10) Patent No.: US 8,279,241 B2
(45) Date of Patent: Oct. 2, 2012

(54) ZOOMING GRAPHICAL USER INTERFACE

(75) Inventor: Jeffrey Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 12/206,759

(22) Filed: Sep. 9, 2008

(65) Prior Publication Data

US 2010/0060666 A1    Mar. 11, 2010

(51) Int. Cl.
*G09G 5/00* (2006.01)
*G06F 3/041* (2006.01)

(52) U.S. Cl. .................... 345/661; 345/666; 345/173

(58) Field of Classification Search ............ 345/173; 382/305; 715/815
See application file for complete search history.

(56) References Cited

U.S. PATENT DOCUMENTS

| | | | |
|---|---|---|---|
| 5,615,384 A | 3/1997 | Allard et al. | |
| 5,732,230 A | 3/1998 | Cullen et al. | |
| 5,956,035 A * | 9/1999 | Sciammarella et al. | 715/815 |
| 6,211,856 B1 | 4/2001 | Choi et al. | |
| 6,252,596 B1 * | 6/2001 | Garland | 715/810 |
| 6,774,890 B2 | 8/2004 | Engholm | |
| 6,966,037 B2 * | 11/2005 | Fredriksson et al. | 715/830 |
| 7,075,512 B1 | 7/2006 | Fabre et al. | |
| 7,075,513 B2 | 7/2006 | Silfverberg et al. | |
| 7,178,111 B2 * | 2/2007 | Glein et al. | 715/848 |
| 7,698,654 B2 * | 4/2010 | Fong et al. | 715/810 |
| 7,707,503 B2 * | 4/2010 | Good et al. | 715/732 |
| 7,817,168 B2 * | 10/2010 | Nagiyama et al. | 345/661 |
| 2002/0149605 A1 | 10/2002 | Grossman | |
| 2006/0031916 A1 * | 2/2006 | Colter et al. | 725/135 |
| 2006/0212827 A1 | 9/2006 | Lee | |
| 2006/0290681 A1 | 12/2006 | Ho et al. | |
| 2011/0128234 A1 * | 6/2011 | Lipman et al. | 345/173 |

FOREIGN PATENT DOCUMENTS

| | | |
|---|---|---|
| KR | 1020060022114 A | 3/2006 |
| KR | 1020070096244 A | 10/2007 |
| WO | 2006003591 A2 | 1/2006 |

OTHER PUBLICATIONS

Jeff Atwood, "Zoomable Interfaces", Retrieved at<< http://www.codinghorror.com/blog/archives/000858.html >>, May 9, 2007, pp. 20.

(Continued)

*Primary Examiner* — David T Welch
(74) *Attorney, Agent, or Firm* — Alleman Hall McCoy Russell & Tuttle LLP (57) ABSTRACT

A method of presenting a hierarchically-organized collection of objects includes displaying a first-level set of first-level objects in a prominent scale; and while displaying the first-level set of first-level objects in the prominent scale, displaying one or more second-level sets of second-level objects in a diminished scale. Each second-level set of second-level objects is linked to a different first-level object. The method further includes recognizing selection of a chosen first-level object, and after recognizing selection of the chosen first-level object: displaying a second-level set of second-level objects linked to the chosen first-level object in a prominent scale; displaying a portion of the chosen first-level object in an enlarged scale; and displaying one or more third-level sets of third-level objects in a diminished scale. Each third-level set of third-level objects is linked to a different one of the second-level objects.

16 Claims, 5 Drawing Sheets

OTHER PUBLICATIONS

"Exclusive: Windows Mobile 7 to Focus on Touch and Motion Gestures", Retrieved at<< http://microsoft.blognewschannel.com/archives/2008/01/06/exclusive-windows-mobile-7-to-focus-on-touch-and-motion-gestures/ >>, Jun. 25, 2008, pp. 38.

"A Deepzoom Primer ( Explained and Coded)..", Retrieved at<< http://blogs.msdn.com/jaimer/archive/2008/03/31/a-deepzoom-primer-explained-and-coded.aspx >>, Jun. 25, 2008, pp. 16.

"Zumobi Features", Retrieved at<< http://www.zumobi.com/Zumobi%20Feature%20White%20Paper.pdf >>, Feb. 7, 2008, pp. 12.

"International Search Report", Mailed Date: Jun. 30, 2010, Application No. PCT/US2009/056459, Filed Date: Sep. 10, 2009, pp. 11.

* cited by examiner

ZOOMING GRAPHICAL USER INTERFACE

BACKGROUND

Graphical user interfaces can be used to provide a user with an easy to learn computing experience. Various graphical user interfaces have been based on different metaphors, such as the desktop metaphor, in which directories of information are represented as folders that appear to be sitting on a virtual desk. While the desktop metaphor is appropriate in many scenarios, it may not provide the most rewarding computing experience in all scenarios.

SUMMARY

A zooming graphical user interface is provided. The zooming graphical user interface presents a hierarchically-organized collection of objects in a plurality of different levels. Each different level is displayed at a different scale, including an enlarged scale, a prominent scale, and a diminished scale. When an object displayed in the prominent scale is selected, that object can be zoomed to the enlarged scale, and lower-level objects linked to that object can be zoomed from the diminished scale to the prominent scale.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to a zooming graphical user interface configured to present a hierarchically-organized collection of objects in a simulated three-dimensional space. The hierarchically-organized collection of objects includes objects organized in a plurality of different levels. Each object is linked to a parent object at a higher level in the hierarchy and/or child object(s) at a lower level in the hierarchy. An object that is a child of an object in a higher level may itself be a parent to one or more objects in a lower level. A parent object can be used to access child objects, which may be used to access grandchild objects, which may be used to access great grandchild objects, and so on. Similarly, a child object may be used to access parent objects.

As used herein, the term object is used to refer to a variety of different items that are displayable by a graphical user interface. Nonlimiting examples of such objects include text, graphics, thumbnail photographs, thumbnail graphics, and the like. Such objects may serve as a visual representation of various different types of data and/or applications. Nonlimiting examples of such data and/or applications include pointer files, audio files, video files, database files, memory addresses, network addresses, email addresses, gaming applications, and the like.

As described in detail below, the parent-child relationship existing between objects on different levels can be reinforced by displaying the different levels at different scales or sizes. Displaying the different levels at different scales helps create an illusion that the different levels exist at different depths along a Z-axis projecting into the graphical user interface. In other words, objects at lower levels appear to be "deeper" into the graphical user interface than objects at higher levels. As a user navigates to higher and lower levels, the objects may zoom and/or shrink to reinforce the illusion. In this way, a user is given the impression that the graphical user interface is made of a large space that can be navigated in a freeform manner. However, the hierarchical organization of the objects is maintained, as described below.

Figure 1:
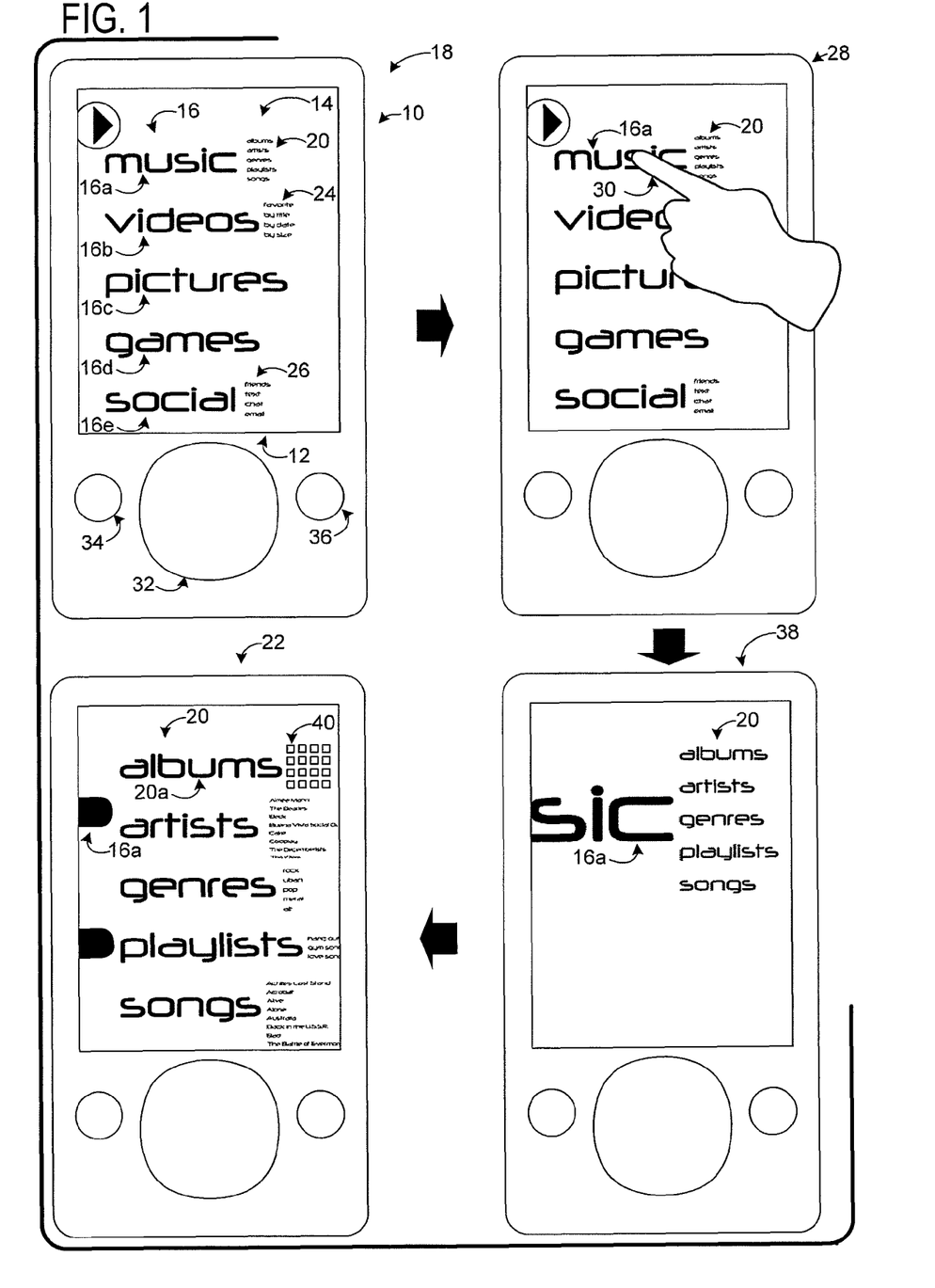
FIG. 1 shows a zooming graphical user interface as it zooms to a deeper layer in a hierarchically-organized collection of objects in accordance with an embodiment of the present disclosure.

For example, FIG. 1 shows a nonlimiting example of a computing device 10 including a display 12 that is presenting a zooming graphical user interface 14 in accordance with the present disclosure. Zooming graphical user interface 14 includes a first-level set 16 of first-level objects, such as "music" object 16a, "video" object 16b, "pictures" object 16c, "games" object 16d, and "social" object 16e.

As used herein, the identifiers "first-level," "second-level," "third-level," and the like are not intended to signal an absolute position within the hierarchically-organized collection of objects. Instead, the identifiers are intended to signal the relative position of objects relative to other objects. For example, the identifier "first-level" may be used to describe an object that has both a parent object and a set of child objects. In such a case, the identifier "first-level" does not mean that the object is at the top of the hierarchy. Further, the identifier "second-level" could be used to refer to child objects of the "first-level" objects, although such "second-level" objects may be more than two levels deep in the hierarchy. The identifiers merely signal relative positioning between objects.

The first-level objects shown in FIG. 1 are displayed in a prominent scale. In other words, the first-level objects are sized large enough for easy viewing without being sized too large for fitting either completely on the display or at least mostly on the display.

While the first-level set of first-level objects are displayed in the prominent scale, one or more second-level sets of second-level objects may be displayed in a diminished scale. As used herein, the phrase "diminished scale" is used to describe a scale that is smaller than a corresponding prominent scale in which the same object can be displayed.

For example, at 18, FIG. 1 shows a second-level set 20 displayed in a diminished scale that is relatively smaller than the prominent scale in which the same second-level set 20 is displayed at 22. The relatively small size of the diminished scale helps enforce the illusion that objects displayed in the diminished scale exist deeper, or farther back, into the graphical user interface.

Each second-level set of second-level objects may be linked to a different first-level object. For example, FIG. 1 shows second-level set 20 of second-level objects associated with object 16a, a second-level set 24 of second-level objects associated with object 16b, and a second-level set 26 of second-level objects associated with object 16e.

A second-level set of second-level objects may be displayed proximate to a first-level object to which that second-level set of second-level objects is linked. For example, second-level set 20 is proximate to object 16a, second-level set 24 is proximate to object 16b, and second-level set 26 is proximate to object 16e. The graphical user interface can visually signal to a user that a parent object is linked to one or more child objects by displaying such child objects proximate to the parent object. Further, by displaying the parent object in a prominent scale and the child object(s) in a diminished scale, the hierarchical order of the parent/child relationship can be visually emphasized.

Child objects displayed in a diminished scale can be displayed in a prominent scale responsive to selection of a linked parent object. For example, at 28, FIG. 1 shows first-level object 16a being selected by a touch input 30. It should be understood that selection may occur via mechanisms other than touch input. For example, one or more user-input controls may be used to select an object of the graphical user interface. Nonlimiting examples of such controls include track pads, joysticks, mice, trackballs, scroll wheels, dials, buttons, or other suitable controls. FIG. 1 shows track pad 32, button 34, and button 36 as exemplary controls, which may be used to select an object. Further, in some embodiments, selection of a child object may result from input directed to the child object itself, the parent object that is linked to the child object, and/or via another suitable scenario and/or mechanism.

Computing device 10 can be configured to recognize selection of a chosen first-level object, and responsive to recognizing selection of the chosen first-level object, zooming the set of second-level objects linked to the chosen first-level object.

As used herein, the term "zooming" is used to describe the process of enlarging an object. An object may be zoomed linearly (i.e., at a constant rate), non-linearly (i.e., rate increases and/or decreases), continuously (i.e., at a relatively fast frame-rate), and/or non-continuously (i.e., in visibly discrete steps). The zooming can be timed to take virtually any desired duration, including a zero duration. Longer zooming durations may help enforce the three-dimensional metaphor of the graphical user interface, while shorter zooming durations may allow for speedy and uninterrupted navigation.

At 38, FIG. 1 shows second-level set 20 in the process of zooming. At 22, FIG. 1 shows second-level set 20 fully zoomed to a prominent scale. As shown in FIG. 1, second-level set 20 is automatically positioned for viewing. Further, other second-level sets, linked to first-level objects that were not chosen, are not displayed when the second-level set linked to the chosen first-level object is zoomed to the prominent scale. In other words, while the zooming interface helps enforce a three-dimensional metaphor, the hierarchical organization of the objects is maintained.

A portion of the chosen first-level object may be displayed in an enlarged scale while the second-level set of second-level objects linked to the chosen first-level object is displayed in a prominent scale. As shown at 22 of FIG. 1, a chosen first-level object 16a may zoom to the enlarged scale from its previous prominent scale while a second-level set 20 linked to the chosen first-level object zooms from a diminished scale to a prominent scale. Such zooming may give a user the impression of moving deeper into the graphical user interface.

An object that is displayed in an enlarged scale may be at least partially cut off. In other words, the complete object may not be displayed. Instead, a portion of the object may be displayed. As an example, only a portion of the letter "C" from chosen first-level object 16a is displayed. Displaying only a portion of a parent object in an enlarged scale leaves more room for displaying child objects in a prominent scale and grandchild objects in a diminished scale. At the same time, the portion of the parent object in the enlarged scale helps maintain the three-dimensional illusion as well as provide a user with a bread crumb for bringing the parent object back into a prominent scale, as described below with reference to FIG. 2.

As shown at 22 of FIG. 1, one or more third-level sets of third-level objects may be displayed in a diminished scale while the second-level objects are displayed in a prominent scale. Each third-level set of third-level objects may be linked to a different one of the second-level objects. For example, third-level set 40 is linked to second-level object 20a. Such third-level sets may zoom into view while the chosen first-level object and linked second-level set are zooming to a larger scale. Third-level sets may be selected to move deeper into the hierarchically-organized collection of objects, as described in more detail with reference to FIG. 3.

As described above, a zooming graphical user interface may be configured to facilitate navigation of objects at increasingly lower levels in a hierarchical organization. The zooming graphical user interface may also be configured to facilitate navigation of objects at increasingly higher levels in a hierarchical organization.

Figure 2:
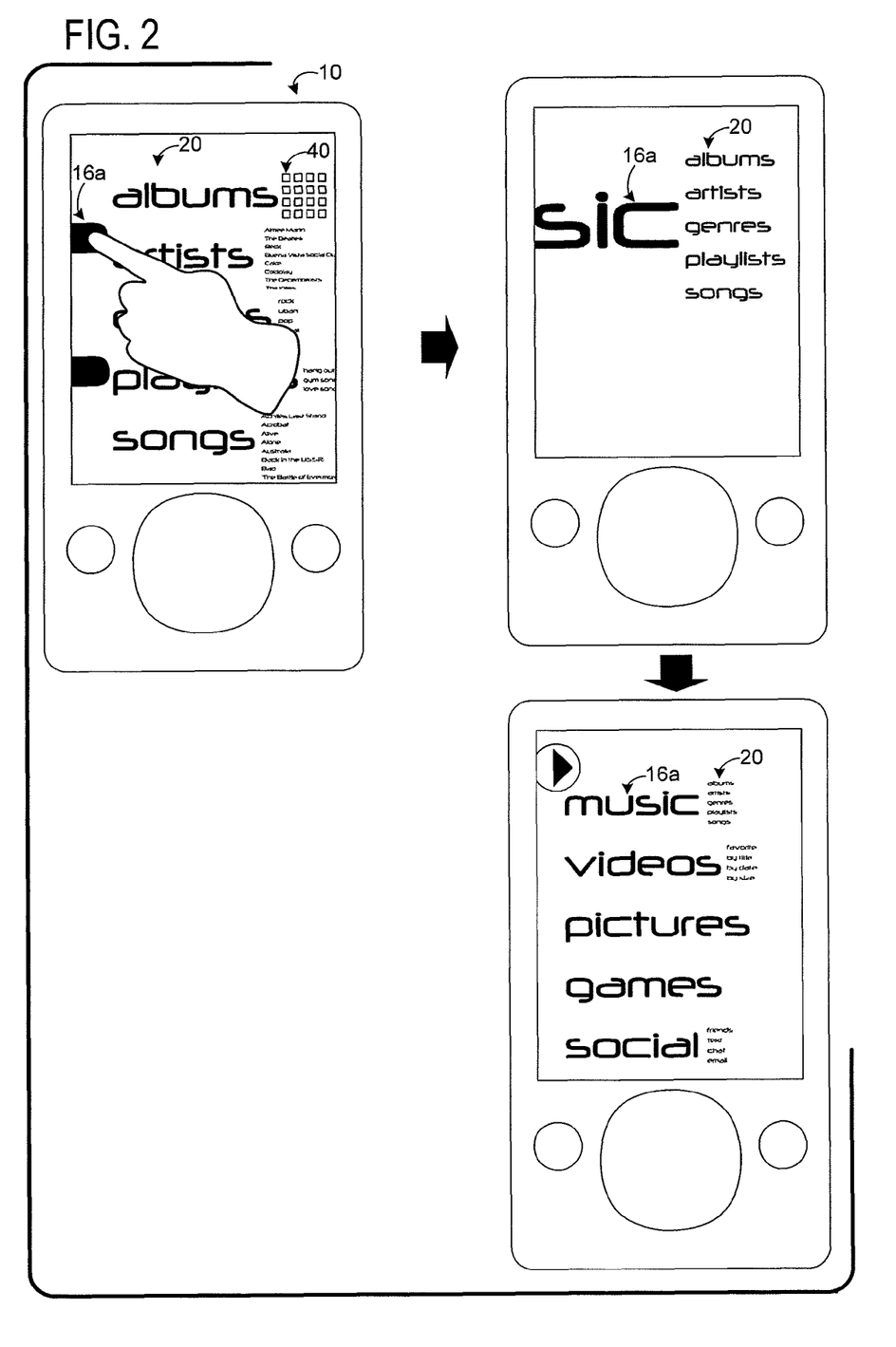
FIG. 2 shows a zooming graphical user interface as it shrinks to a higher layer in a hierarchically-organized collection of objects in accordance with an embodiment of the present disclosure.

As shown in FIG. 2, a first-level object 16a displayed in an enlarged scale may be selected to navigate back up through a hierarchically-organized collection of objects. Responsive to such selection, first-level object 16a may be shrunk from the enlarged scale to a prominent scale. Similarly, a linked second-level set 20 of second-level objects may be shrunk from a prominent scale to a diminished scale. Third-level sets of third-level objects (e.g., third-level set 40) may also be shrunk out of view. In this manner, the graphical user interface gives a user the impression of moving out of the graphical user interface, away from the deeper levels.

Figure 3:
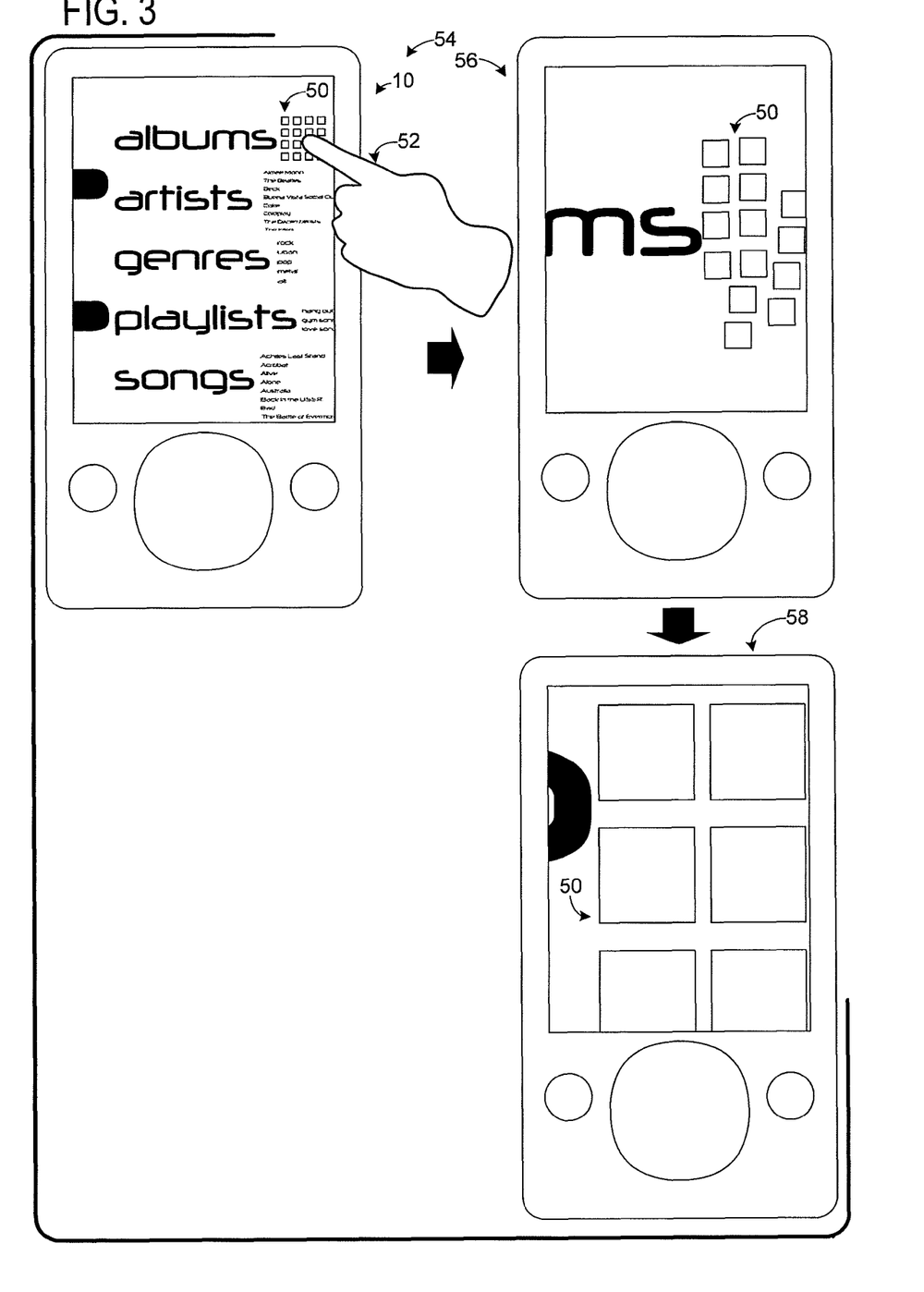
FIG. 3 shows a zooming graphical user interface as a child set of objects is rearranged while zooming from a diminished scale to a prominent scale in accordance with an embodiment of the present disclosure.

FIG. 3 shows another example where selection of a child set 50 of objects causes the child set of objects to zoom from a diminished scale to a prominent scale. In the illustrated embodiment, child set 50 includes a plurality of icons schematically represented as white squares. Such icons may be digital representations of album covers, for example. In the illustrated embodiment, child set 50 is selected by touch input 52 directed to child set 50. In other embodiments, the child set may be selected by input other than touch input. Also, in some embodiments, a child set may be selected by input, touch or otherwise, directed to a parent object linked to the child set.

In some embodiments, a child set of objects, such as child set 50, may be rearranged after the child set is selected. In some embodiments, the individual objects that constitute the child set of objects may be dynamically rearranged relative to one another while being zoomed from a diminished scale to a prominent scale. For example, at 54, FIG. 3 shows child set 50 arranged as a four-column table. At 56, the four-column table is being dynamically rearranged into a two-column table, as shown at 58. Rearrangement from a four-column table to a two-column table is only one nonlimiting example of suitable rearrangements. The objects of a child set of objects may be rearranged in virtually any manner while remaining within the scope of this disclosure. For example, objects of a particular type may be rearranged for viewing on the display presenting the graphical user interface. As an example, the two-column view shown at 58 allows the icons to be displayed at a relatively large scale, and allows all icons in the set to be viewed by using only vertical scrolling, as opposed to a combination of vertical scrolling and horizontal scrolling.

In some embodiments, a zooming graphical user interface may be configured to present both a hierarchically-organized collection of objects in a zooming tree-like structure, as described above, and an alternative structure in which parent-child relationships are not strictly enforced. Such an alternative structure may allow objects from different levels and/or different branches of a hierarchy to be viewed side-by-side. As a nonlimiting example, an alternative menu may include favorite and/or recommended objects.

Figure 4:
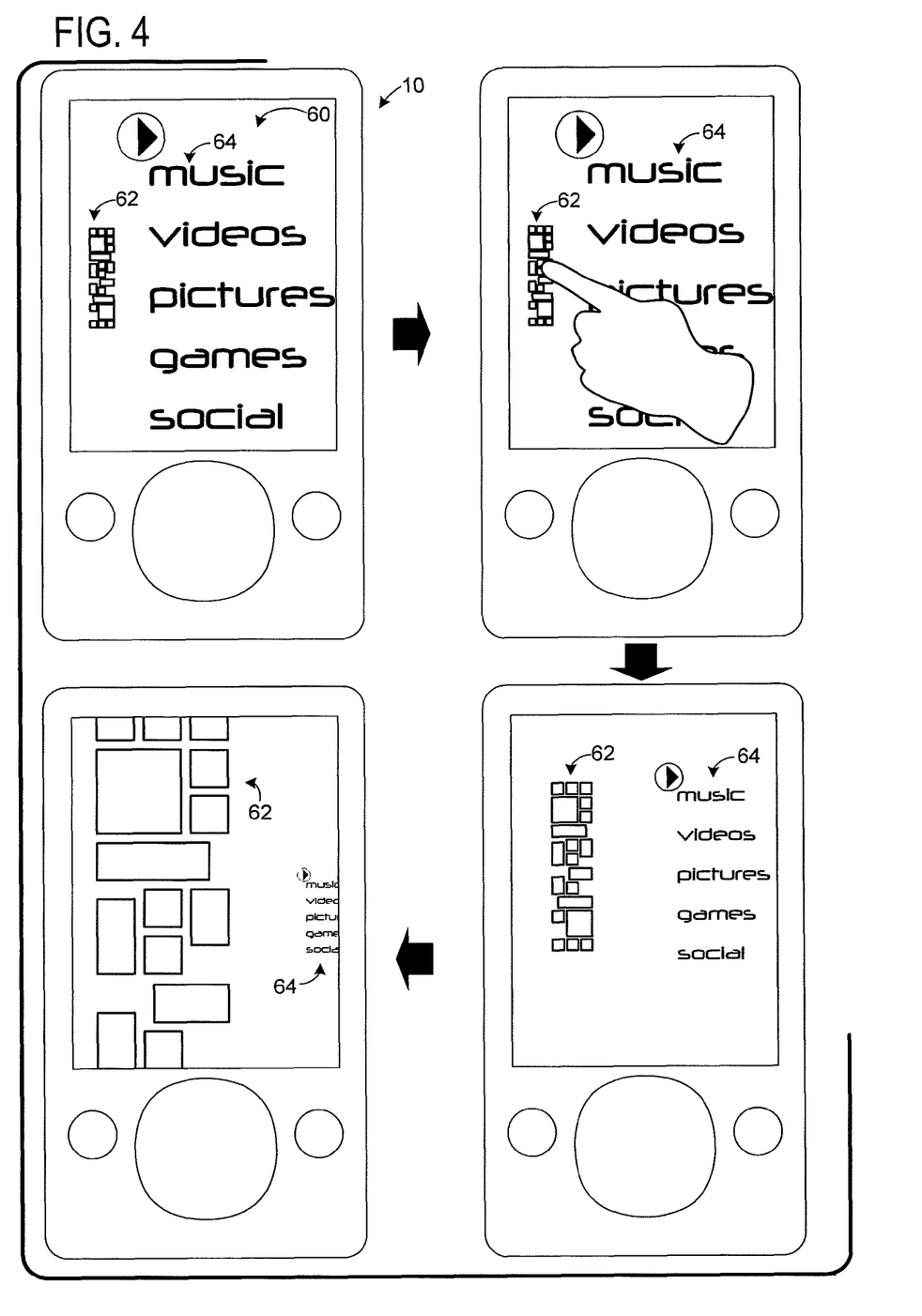
FIG. 4 shows a zooming graphical user interface that supports navigation via a menu enforcing a hierarchical organization and an alternative menu that does not enforce hierarchical organization in accordance with an embodiment of the present disclosure.

FIG. 4 shows a zooming graphical user interface 60 displaying an alternative menu 62 in a diminished scale while displaying a first-level set 64 of first-level objects in a prominent scale. Upon recognizing selection of alternative menu 62, the alternative menu may be zoomed from a diminished scale to a prominent scale. The zooming graphical user interface may enforce the three-dimension metaphor by shrinking first-level set 64 of first-level objects from the prominent scale to a diminished scale. In this manner, a user may take advantage of the alternative menu. If the user wishes to switch back to the hierarchically-organized menu, the user may select the diminished first-level set of first-level objects, thus causing the first-level set to zoom back into a prominent scale. In some embodiments, a graphical user interface may present both a hierarchically-organized menu and an alternative menu at the same scale, thus allowing a user to make an initial selection between the menus. In some embodiments, the menu that was last in use will be displayed in a prominent scale when a computing device is restarted and/or the menus are reactivated.

Figure 5:
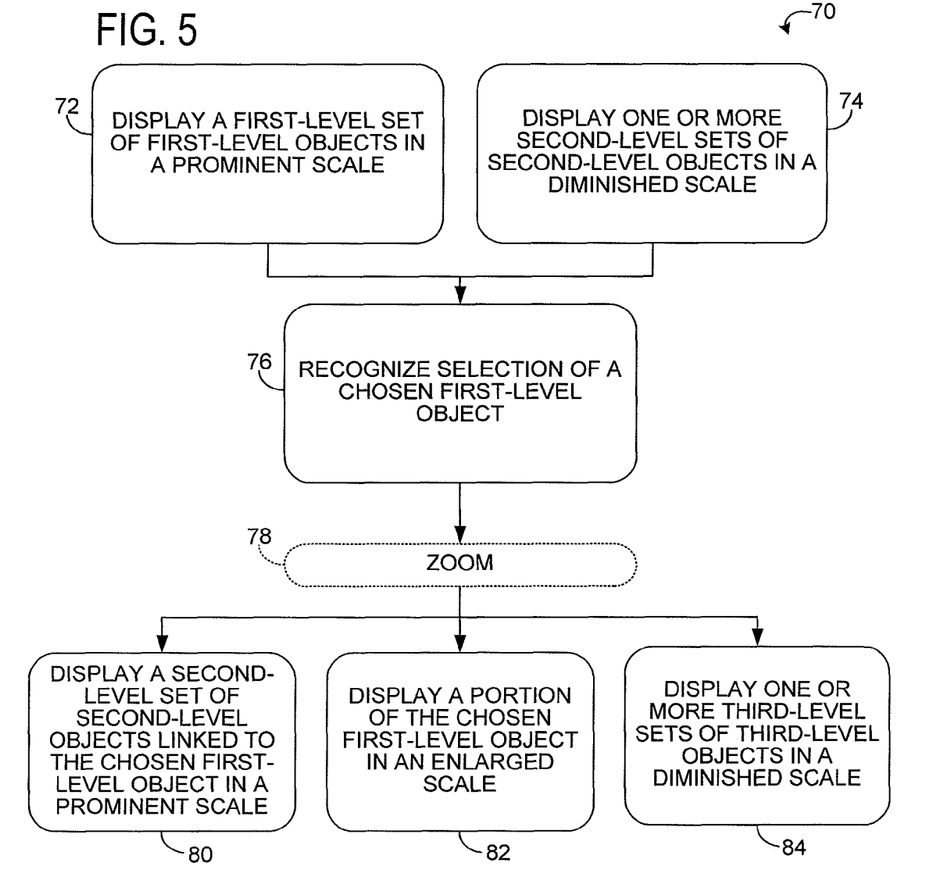
FIG. 5 shows a process flow of an example method of presenting a hierarchically-organized collection of objects.

FIG. 5 is a process flow of a method 70 of presenting a hierarchically-organized collection of objects. At 72, method 70 includes displaying a first-level set of first-level objects in a prominent scale. At 74, method 70 includes displaying one or more second-level sets of second-level objects in a diminished scale. At 76, method 70 includes recognizing selection of a chosen first-level object. At 78, method 70 includes zooming both the chosen first-level object and the second-level set of second-level objects linked to the chosen first-level object. At 80, method 70 includes displaying a second-level set of second-level objects linked to the chosen first-level object in a prominent scale. At 82, method 70 includes displaying a portion of the chosen first-level object in an enlarged scale. At 84, method 70 includes displaying one or more third-level sets of third-level objects in a diminished scale.

Figure 6:
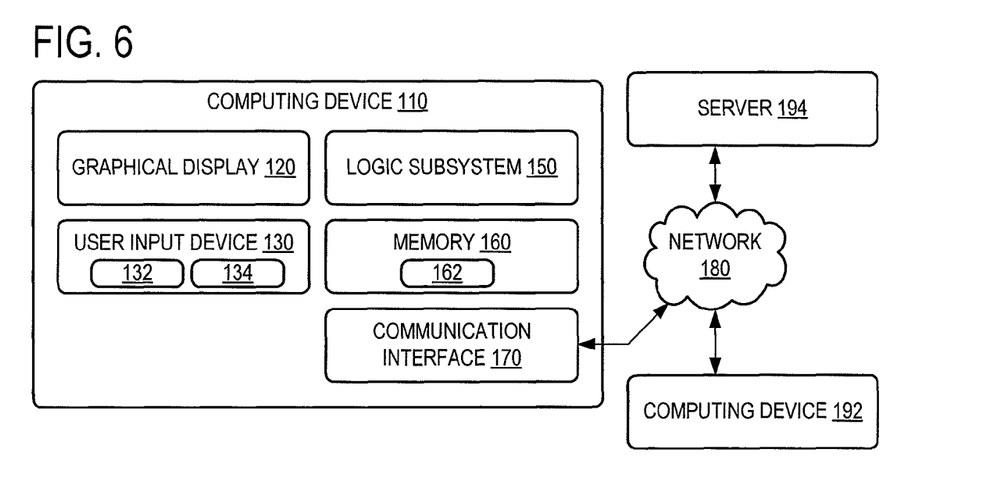
FIG. 6 schematically shows a computing device configured to use a zooming graphical user interface in accordance with an embodiment of the present disclosure.

FIG. 6 somewhat schematically shows a computing device 110 configured to utilize the above described zooming graphical user interface. It should be understood that computing devices configured differently than computing device 10 may also use a zooming graphical user interface in accordance with the present disclosure.

Computing device 110 may include one or more of the following components: a graphical display 120, a user input device 130, a logic subsystem 150, memory 160, and a communication interface 170. It should be appreciated that computing device 110 may include other suitable components beyond those specifically described herein.

Graphical display 120 may include any suitable output device for presenting visual media content. Non-limiting examples of graphical display 120 include liquid crystal displays (LCDs), plasma displays, cathode ray tube (CRT) displays, electronic paper displays, light emitting diode (LED) displays, rear projection displays, and front projection displays, among others and combinations thereof. As will be described in greater detail with reference to user input device 130, graphical display 120 may optionally include a touch-sensitive region for receiving user input. As such, graphical display 120 may be configured to provide both input and output functionality in some embodiments.

User input device 130 may include one or more user input components. For example, user input device 130 may include one or more buttons 132 which enable the computing device to receive user input. In some embodiments, user input device 130 may include a touch-sensitive region 134 of graphical display 120. In some embodiments, the computing device may receive user input via one or more buttons 132 and touch-sensitive region 134 of graphical display 120. Although not shown, a mouse, trackball, or other input device may additionally or alternatively be used. As such, it should be appreciated that user input may be received by the computing device via any suitable number and combination of user input components of the user input device.

Logic subsystem 150 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, change the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 160 may include one or more physical devices configured to hold data and/or instructions (e.g., depicted schematically at 162) that, when executed by the logic subsystem, cause the logic subsystem to implement the herein described methods and processes. Memory 160 may include removable media and/or built-in devices. Memory 160 may include optical memory devices, semiconductor memory devices, and/or magnetic memory devices, among others. Memory 160 may include portions with one or more of the following characteristics: volatile, nonvolatile, dynamic, static, read/write, read-only, random access, sequential access, location addressable, file addressable, and content addressable. In some embodiments, logic subsystem 150 and memory 160 may be integrated into one or more common devices and/or computing systems.

Computing device 110 may communicate with a network 180 via a communication interface 170. Communication interface 170 may include one or more of a receiver, transmitter, transceiver, etc. for communicating with network 180 via wireless and/or wired communication. Network 180 may represent one or more local area networks and wide area networks. As one example, network 180 represents the Internet. As another example, network 180 represents a short range local area network established between computing device 110 and one or more other computing devices. In this way, computing device 110 may utilize network 180 to communicate with one or more servers, such as server 194, and one or more client computing devices, such as computing device 192. As a non-limiting example, server 194 represents a web server, and computing device 192 represents a second computing device.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of presenting a hierarchically-organized collection of objects with a computing device, the method comprising:
    displaying a first-level set of first-level objects in a prominent scale with the computing device;
    while displaying the first-level set of first-level objects in the prominent scale, displaying a plurality of second-level sets of second-level objects in a diminished scale with the computing device, each second-level set of second-level objects linked to a different first-level object and spatially positioned to a same side of the first-level object to which that second-level set of second-level objects is linked;
    recognizing selection of a chosen first-level object with the computing device; and
    responsive to recognizing selection of the chosen first-level object:
        zooming a second-level set of second-level objects linked to the chosen first-level object from the diminished scale to a prominent scale while shifting a spatial position of the second-level set of second-level objects in a direction towards the first-level set of first-level objects, wherein the second-level set of second-level objects are displayed in one or more intermediate scales between the diminished scale and the prominent scale while zooming;
        zooming the chosen first-level object from the prominent scale to an enlarged scale while shifting a spatial position of the first-level object in the direction, wherein the first-level set of first-level objects are displayed in one or more intermediate scales between the prominent scale and the enlarged scale while zooming; and
        while displaying the second-level set of second-level objects in the prominent scale and a portion of the chosen first-level object in the enlarged scale, displaying one or more third-level sets of third-level objects in a diminished scale with the computing device, each third-level set of third-level objects linked to a different one of the second-level objects.

2. The method of claim 1, further comprising:
    recognizing selection of the chosen first-level object while the chosen first-level object is in the enlarged scale; and
    responsive to recognizing selection of the chosen first-level object while the chosen first-level object is in the enlarged scale:
        shrinking the chosen first-level object from the enlarged scale to a prominent scale; and
        shrinking the second-level set of second-level objects linked to the chosen first-level object from a prominent scale to a diminished scale.

3. The method of claim 1, where at least a portion of the chosen first-level object is cut off while displayed in the enlarged scale.

4. The method of claim 1, further comprising rearranging the second-level objects linked to the chosen first-level object responsive to recognizing selection of the chosen first-level object.

5. The method of claim 4, where the second-level objects are rearranged while being zoomed from the diminished scale to the prominent scale.

6. The method of claim 1, where, while displayed in a diminished scale, each second-level set of second-level objects is displayed proximate to a first-level object to which that second-level set of second-level objects is linked.

7. The method of claim 1, where recognizing selection of the chosen first-level object includes recognizing a touch input directed to the chosen first-level object.

8. The method of claim 1, further comprising displaying an alternative menu in a diminished scale while displaying the first-level set of first-level objects in a prominent scale.

9. The method of claim 8, further comprising:
    recognizing selection of the alternative menu; and
    responsive to recognizing selection of the alternative menu:
        zooming the alternative menu from a diminished scale to a prominent scale; and
        shrinking the first-level set of first-level objects from the prominent scale to a diminished scale.

10. The method of claim 1, wherein the second-level objects are zoomed linearly.

11. The method of claim 1, wherein the second-level objects are zoomed non-linearly.

12. The method of claim 1, wherein the second-level objects are zoomed continuously.

13. The method of claim 1, wherein the second-level objects are zoomed non-continuously.

14. A computing device, comprising:
    a touch-screen display;
    a logic subsystem operatively connected to the touch-screen display; and
    memory operatively connected to the logic subsystem, the memory holding instructions that, when executed by the logic subsystem, cause the computing device to:
        display a first-level set of first-level objects in a prominent scale;
        while displaying the first-level set of first-level objects in the prominent scale, display a plurality of second-level sets of second-level objects in a diminished scale, each second-level set of second-level objects linked to a different first-level object and spatially positioned to a same side of the first-level object to which that second-level set of second-level objects is linked;
        recognize selection of a chosen first-level object; and
        after recognizing selection of the chosen first-level object:
            zoom the first-level set of first-level objects from the prominent scale to an enlarged scale while each of the first-level objects of the first-level set spatially shifts towards a same side of the touch-screen display;
            zoom the second-level set of second-level objects from the diminished scale to a prominent scale while each second-level object of the second-level set linked to the chosen first-level object spatially shifts towards the same side of the touch-screen display; and zoom one or more third-level sets of third-level objects to a diminished scale, each third-level set of third-level objects linked to a different one of the second-level objects.

15. The computing device of claim 14, where the memory further holds instructions that, when executed by the logic subsystem, cause the computing device to:

recognize selection of the chosen first-level object while the chosen first-level object is in the enlarged scale; and responsive to recognizing selection of the chosen first-level object while the chosen first-level object is in the enlarged scale:

display the chosen first-level object in a prominent scale; and display the second-level set of second-level objects linked to the chosen first-level object in a diminished scale.

16. The computing device of claim 14, where at least a portion of the chosen first-level object is cut off while displayed in the enlarged scale.

* * * * *